(12) United States Patent
Kusunoki (10) Patent No.: US 8,634,446 B2
(45) Date of Patent: Jan. 21, 2014

(54) FREQUENCY LEVEL DETECTING METHOD

(75) Inventor: Hideyuki Kusunoki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 503 days.

(21) Appl. No.: 12/878,856

(22) Filed: Sep. 9, 2010

(65) Prior Publication Data

US 2011/0062994 A1  Mar. 17, 2011

(30) Foreign Application Priority Data

Sep. 14, 2009  (JP) ................... 2009-211991

(51) Int. Cl.
*H04B 1/00* (2006.01)
(52) U.S. Cl.
USPC .......................................... 375/130; 375/340
(58) Field of Classification Search
USPC .......... 375/130, 140, 147, 340, 377, 344, 367
See application file for complete search history.

(56) References Cited

U.S. PATENT DOCUMENTS

| | | | |
|---|---|---|---|
| 2004/0013321 A1 | 1/2004 | Ohkawa | |
| 2004/0240522 A1* | 12/2004 | Bu et al. ................ | 375/130 |
| 2005/0063021 A1 | 3/2005 | Sakai | |
| 2005/0069019 A1* | 3/2005 | Kaizuka ................ | 375/130 |
| 2006/0098714 A1* | 5/2006 | Shin et al. .............. | 375/130 |
| 2008/0316292 A1 | 12/2008 | Shukuya | |
| 2009/0190631 A1* | 7/2009 | Hsieh et al. ........... | 375/130 |
| 2009/0284297 A1 | 11/2009 | Ebuchi | |
| 2010/0080264 A1 | 4/2010 | Yokochi | |
| 2010/0080630 A1 | 4/2010 | Nishiyama | |
| 2011/0062994 A1 | 3/2011 | Kusunoki | |
| 2012/0105919 A1 | 5/2012 | Kusunoki | |

FOREIGN PATENT DOCUMENTS

| | | |
|---|---|---|
| JP | S63-187949 A | 8/1988 |
| JP | 2000-224392 A | 8/2000 |
| JP | 2001-191585 A | 7/2001 |
| JP | 2002-281252 A | 9/2002 |
| JP | 2003-060862 A | 2/2003 |

(Continued)

OTHER PUBLICATIONS

Japan Patent Office, Notice of Allowance for Japanese Patent Application No. 2009-211991 (counterpart to above-captioned patent application), mailed Aug. 2, 2011.

(Continued)

*Primary Examiner* — Jean B Corrielus
(74) *Attorney, Agent, or Firm* — Baker Botts L.L.P.

(57) ABSTRACT

A frequency level detecting method includes counting pulses of a spread-spectrum clock, the spread-spectrum clock having a frequency that is modulated within a frequency range from a minimum frequency to a maximum frequency in a constant modulation period of time, the frequency range being divided into a plurality of sub-ranges each corresponding to one of a plurality of frequency levels; determining at least one to-be-counted value range corresponding to one of the plurality of sub-ranges; judging whether or not the counted pulses fall within one of the at least one to-be-counted value range; and generating a level detection signal if the counted pulses fall within the one of the at least one to-be-counted value range, the level detection signal indicating that a frequency of the spread-spectrum clock falls within one of the plurality of frequency levels that corresponds to one of the plurality of sub-ranges corresponding to the one of the at least one to-be-counted value range.

18 Claims, 11 Drawing Sheets

(56) References Cited

FOREIGN PATENT DOCUMENTS

| | | |
|---|---|---|
| JP | 2004-072606 A | 3/2004 |
| JP | 2005-094655 A | 4/2005 |
| JP | 2006-332924 A | 12/2006 |
| JP | 2007-078617 A | 3/2007 |
| JP | 2008-077199 A | 4/2008 |
| JP | 2010-079203 A | 4/2010 |
| JP | 2010-087805 A | 4/2010 |
| JP | 2010-160588 A | 7/2010 |
| JP | 2011-061705 A | 3/2011 |
| WO | 2007-080719 A1 | 7/2007 |

OTHER PUBLICATIONS

Japan Patent Office, Office Action for Japanese Patent Application No. 2010-244527 (counterpart Japanese patent application), mailed Jan. 29, 2013.

United States Patent and Trademark Office, Non Final Rejection for U.S. Appl. No. 13/282,396 (related to above-captioned patent application), mailed Jul. 23, 2013.

* cited by examiner

FREQUENCY LEVEL DETECTING METHOD

CROSS REFERENCE TO RELATED APPLICATION

This application claims priority from Japanese Patent Application No. 2009-211991 filed Sep. 14, 2009. The entire content of the priority application is incorporated herein by reference.

TECHNICAL FIELD

The present invention relates to a frequency level detecting method and a frequency level detecting device.

BACKGROUND

Conventionally, spread-spectrum clocks have been used to reduce electromagnetic interference (EMI), which is an important issue in the system design of electronic devices and the like. A spread-spectrum clock for reducing EMI is produced by modulating a reference clock having a constant frequency.

For example, elements of a scanner or other image-reading device used to control the timing for reading an image are themselves controlled based on a clock signal. However, a problem with conventional image-reading devices is the generation of EMI when the various components are controlled based on the pulses of a reference clock having a constant frequency. Further, if the same components are controlled based on the pulses of a spread-spectrum clock obtained by frequency-modulating a reference clock on a time axis, the data acquisition timing may vary since the clock pulses are not constant.

SUMMARY

In view of the foregoing, it is an object of the invention to provide a method and device for detecting the frequency level of a spread-spectrum clock whose frequency is spread over a plurality of frequency levels within a constant modulation period.

In order to attain the above and other objects, the invention provides a frequency level detecting method including: (a) counting pulses of a spread-spectrum clock, the spread-spectrum clock having a frequency that is modulated within a frequency range from a minimum frequency to a maximum frequency in a constant modulation period of time, the frequency range being divided into a plurality of sub-ranges each corresponding to one of a plurality of frequency levels; determining at least one to-be-counted value range corresponding to one of the plurality of sub-ranges; judging whether or not the counted pulses fall within one of the at least one to-be-counted value range; and generating a level detection signal if the counted pulses fall within the one of the at least one to-be-counted value range, the level detection signal indicating that a frequency of the spread-spectrum clock falls within one of the plurality of frequency levels that corresponds to one of the plurality of sub-ranges corresponding to the one of the at least one to-be-counted value range.

According to another aspect, the present invention provides a frequency level detecting device including a counting unit, a storing unit, a judging unit, and a generating unit. The counting unit is configured to count pulses of a spread-spectrum clock. The spread-spectrum clock has a frequency that is modulated within a frequency range from a minimum frequency to a maximum frequency in a constant modulation period of time. The frequency range is divided into a plurality of sub-ranges each corresponding to one of a plurality of frequency levels. The storing unit is configured to store data indicative of at least one to-be-counted value range corresponding to one of the plurality of sub-ranges. The judging unit is configured to judge whether or not the counted pulses fall within one of the at least one to-be-counted value range. The generating unit is configured to generate a level detection signal if the judging unit judges that the counted pulses fall within one of the at least one to-be-counted value range. The level detection signal indicates that a frequency of the spread-spectrum clock falls within one of the plurality of frequency levels that corresponds to one of the plurality of sub-ranges corresponding to the one of the at least one to-be-counted value range.

According to another aspect, the present invention provides a frequency level detecting device including a counting unit, a time measuring unit, a storing unit, a judging unit, and a generating unit. The counting unit is configured to count pulses of a spread-spectrum clock. The spread-spectrum clock has a frequency that is modulated within a frequency range from a minimum frequency to a maximum frequency in a constant modulation period of time. The frequency range is divided into a plurality of sub-ranges each corresponding to one of a plurality of frequency levels. The time measuring unit is configured to measure a period of time defined since the counting unit has started counting the pulses of the spread-spectrum clock until the counting unit has counted a prescribed number of pulses of the spread-spectrum clock. The storing unit is configured to store data indicative of at least one to-be-measured time range corresponding to one of the plurality of sub-ranges. The judging unit is configured to judge whether or not the measured period of time falls within one of the at least one to-be-measured time range. The generating unit is configured to generate a level detection signal if the judging unit judges that the measured period of time falls within one of the at least one to-be-measured time range. The level detection signal indicating that a frequency of the spread-spectrum clock falls within one of the plurality of frequency levels that corresponds to one of the plurality of sub-ranges corresponding to the one of the at least one to-be-measured time range.

BRIEF DESCRIPTION OF THE DRAWINGS

The particular features and advantages of the invention as well as other objects will become apparent from the following description taken in connection with the accompanying drawings, in which.

DETAILED DESCRIPTION

A frequency level detecting device according to embodiments of the invention will be described while referring to the accompanying drawings wherein like parts and components are designated by the same reference numerals to avoid duplicating description.

Figure 1:
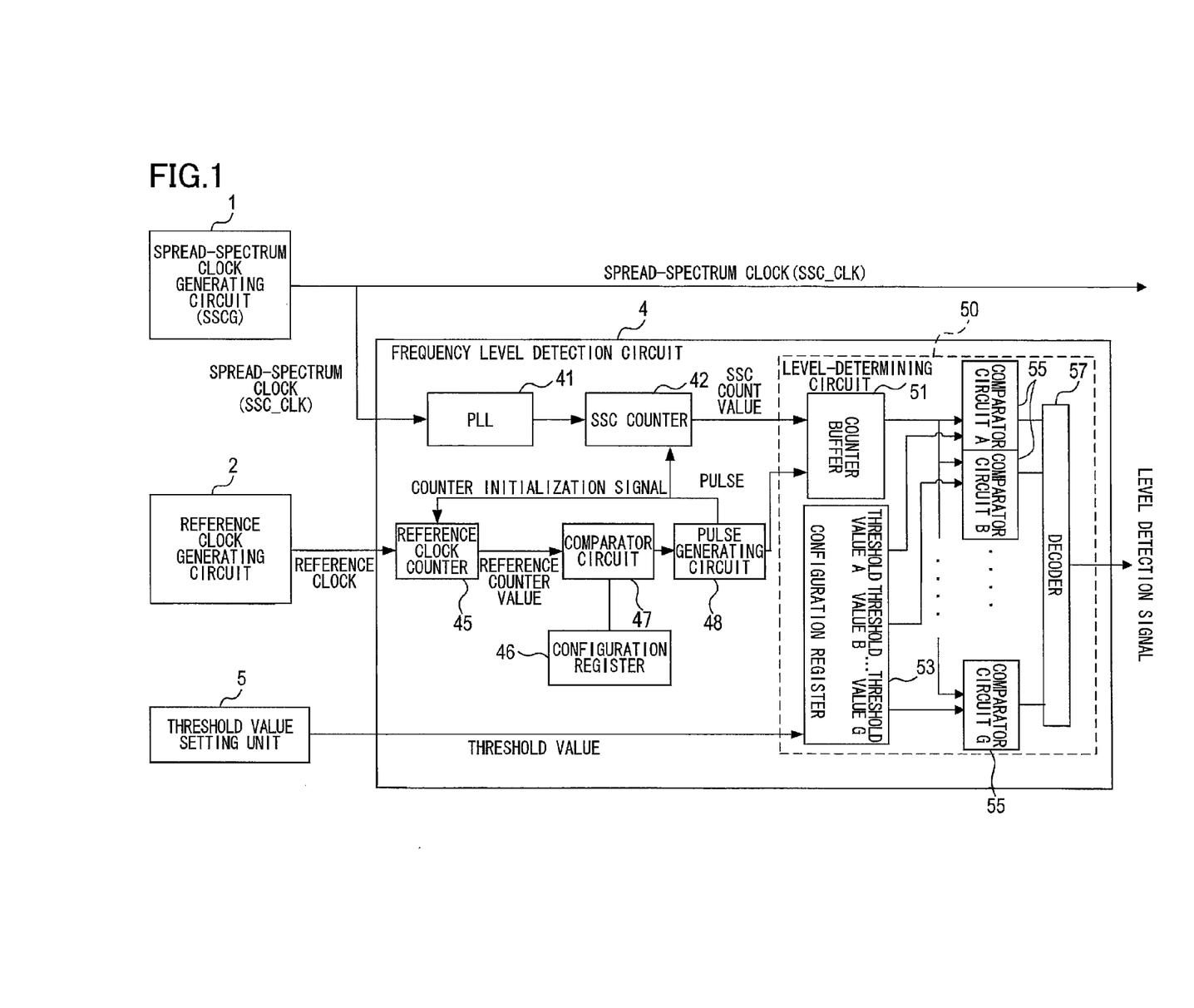
FIG. 1 is a block diagram showing the configuration of a frequency level detecting device according to a first embodiment of the invention.

As shown in FIG. 1, a frequency level detection circuit 4 is provided with a phase-locked loop (PLL) 41, a spread-spectrum clock (SSC) counter 42, a reference clock counter 45, a configuration register 46, a comparator circuit 47, a pulse generating circuit 48, and a level-determining circuit 50.

The PLL 41 is configured to multiply by a constant factor a spread-spectrum clock SSC_CLK generated by a spread-spectrum clock generating circuit 1. The spread-spectrum clock (SSC) counter 42 is configured to count pulses of the spread-spectrum clock SSC_CLK multiplied by the PLL 41.

The reference clock counter 45 is configured to count clock pulses of a reference clock generated by a reference clock generating circuit 2, as reference counter clock. The configuration register 46 stores a prescribed counter value. The comparator circuit 47 is configured to compare the count of the clock pulses of the reference clock counted by the reference clock counter 45 with the prescribed counter value stored in the configuration register 46. The pulse generating circuit 48 is configured to generate a pulse when the reference counter value and prescribed counter value that are compared by the comparator circuit 47 match, in other words, when the count of the clock counter values has reached to the prescribed value.

Figure 2:
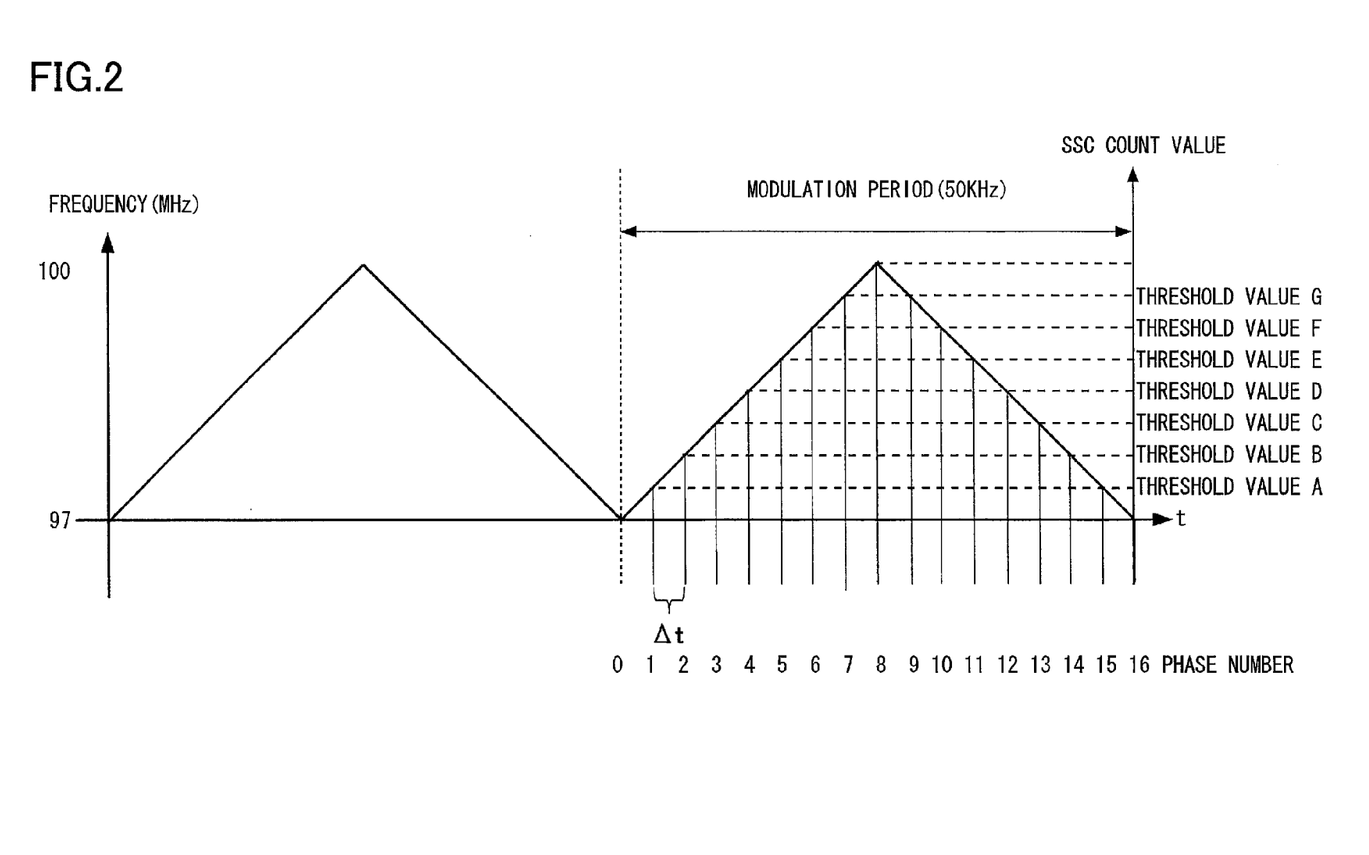
FIG. 2 is a graph showing an example of a spread-spectrum clock whose frequency level is detected by the frequency level detecting device according to the first embodiment.

As shown in FIG. 2, the frequency of the spread-spectrum clock SSC_CLK is modulated within a constant modulation period of time. The frequency levels of an 8-level spread-spectrum clock SSC_CLK can be defined by dividing this modulation period by 16. In other words, the frequency range is divided into a plurality of sub-ranges each corresponding to one of a plurality of frequency levels. In the example of FIG. 2, the spread-spectrum clock SSC_CLK is modulated within a frequency range from 97 MHz (minimum frequency) to 100 MHz (maximum frequency) in a constant modulation period of 50 KHz. A fixed interval $\Delta t$ is defined by dividing the modulation period by 16 divisions. The configuration register 46 (see FIG. 1) stores, as the prescribed counter value, the number of the pulses of reference clock to be counted during the fixed interval $\Delta t$. The reference clock counter 45, the configuration register 46, and the comparator circuit 47 measure a fixed period of time.

Further, as shown in FIG. 1, the pulse outputted by the pulse generating circuit 48 is also inputted into the reference clock counter 45 as a counter initialization signal. Accordingly, the pulse generating circuit 48 generates one pulse each time the fixed interval $\Delta t$ elapses. The counter initialization signal is also inputted into the SSC counter 42. The SSC count value counted by the SSC counter 42 during the fixed interval $\Delta t$ is saved in a counter buffer 51 of the level-determining circuit 50 in synchronization with each pulse generated by the pulse generating circuit 48.

The level-determining circuit 50 includes the counter buffer 51, a configuration register 53, seven comparator circuits 55, and a decoder 57. The configuration register 53 stores data including seven threshold values described later. The seven comparator circuits 55 is configured to compare the SSC count value saved in the counter buffer 51 with each of the threshold values stored in the configuration register 53. The decoder 57 is configured to generate and output a level detection signal based on results of comparisons by the comparator circuits 55. A threshold value setting unit 5 is configured to change and set the threshold values stored in the configuration register 53.

As shown in FIG. 2, the frequency of the spread-spectrum clock SSC_CLK is divided into eight sub-ranges corresponding to eight frequency levels when dividing the modulation period by 16. Specifically, in order from the lowest frequency level, the frequency range 97-97.375 MHz is set to level 0, the frequency range 97.375-97.750 MHz is set to level 1, and so on up to the frequency range 99.625-100 MHz set to level 7. The configuration register 53 stores a value calculated based on the count values of the spread-spectrum clock SSC_CLK that is to be counted during the fixed interval $\Delta t$ for each range of frequency levels as seven threshold values A-G. In the first embodiment, the stored threshold values A-G are multiplied by a constant factor 'm'. The seven comparator circuits 55 compare the SSC count value during the fixed interval $\Delta t$ stored in the counter buffer 51 with each respective threshold value. In other words, the seven comparator circuits 55 judge whether or not the SSC count values counted by the SSC counter 42 falls within one of ranges corresponding to each frequency levels. Each range is defined by adjacent two threshold values of the threshold values A-G.

The decoder 57 is configured to generate and output a level detection signal representing the frequency level of the spread-spectrum clock SSC_CLK at the current point in time based on the results of comparisons by the comparator circuits 55. Specifically, the decoder 57 generates the level detection signal if the SSC count value falls within one of the ranges defined by the threshold values A-G. The level detection signal indicates that a frequency of the spread-spectrum clock SSC_CLK falls within the frequency levels corresponds to the sub-range corresponding to the one of the range.

Figure 3:
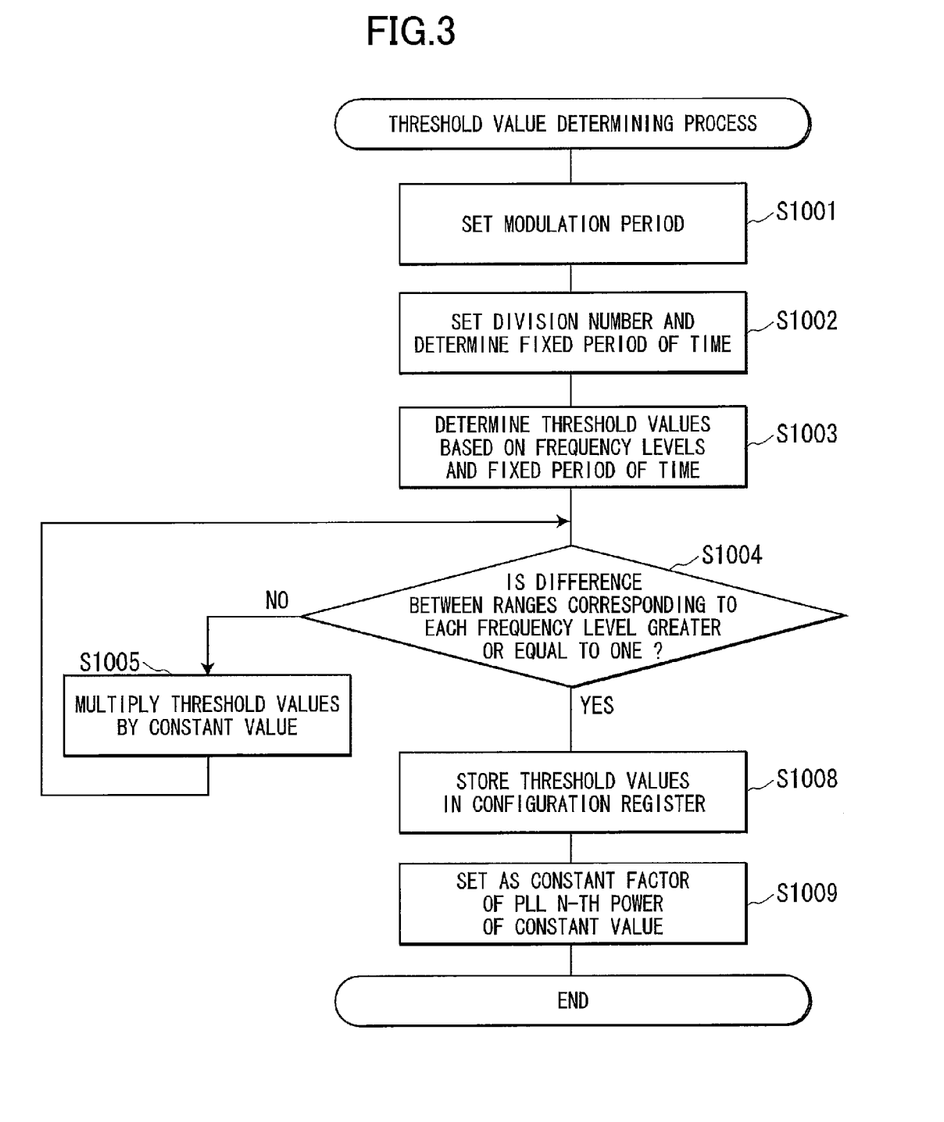
FIG. 3 is a flowchart illustrating steps in a threshold value determining process executed by a threshold value setting unit.

FIG. 3 is a flowchart illustrating steps in a threshold value determining process executed by the threshold value setting unit 5. In S1001 (hereinafter, "S" represents "step") in the threshold value determining process, the threshold value setting unit 5 acquires data indicative of the modulation period from a ROM (not shown) provided in an image forming device 910 shown in FIG. 6 described later. A CPU (not shown) provided in the image forming device 910 may be used as the threshold value setting unit 5. The modulation period is set to 50 KHz in the first embodiment. In S1002, the threshold value setting unit 5 acquires data indicative of the division number from the ROM. If the image forming device 910 shown in FIG. 6 has a plurality of modes, the ROM stores the data indicative of the modulation period and the division number for each mode. In the first embodiment, the division number is set to 16. Then, the threshold value setting unit 5 determines the fixed interval $\Delta t$ by dividing the modulation period of 50 KHz by 16, and further determines the number of frequency levels (eight frequency levels in the first embodiment) by dividing the division number by two.

In S1003, the threshold value setting unit 5 determines, based on relationships between the frequency levels and the fixed interval Δt, theoretical threshold values A-G indicating arrange of the number of pulses of the spread-spectrum clock SSC_CLK which is to be counted during the fixed interval Δt if the frequency of the spread-spectrum clock falls in the one of the plurality of sub-ranges. For example, the theoretical threshold value A is defined as a number of count values to be counted during while the frequency is continuously changing from 97 MHz to 97.375 MHz.

In S1004, the threshold value setting unit 5 judges whether or not a difference between each two adjacent threshold values A-G is greater than or equal to one. If the threshold value setting unit 5 determines that at least one difference is smaller than one (S1004: No), the threshold value setting unit 5 multiplies the threshold values A-G by a constant value "c" in S1005 and proceeds back to S1004 to again determine whether or not the difference between each two adjacent threshold values A-G is greater than or equal to one.

When the all differences between the threshold values A-G are greater than or equal to one (S1004: Yes), the threshold value setting unit 5 stores the threshold values A-G in the configuration register 53 (S1008). In S1009, the threshold value setting unit 5 sets the prescribed factor m of the PLL 41 to the a-th power of the constant value 'c' in S1005. Here, 'c' is an integer greater than one, and 'a' is defined as the number of times that the process of S1005 has been executed.

As described above, the threshold value setting unit 5 determines, as each count value range corresponding to one of the plurality of sub-ranges, a range of the number of pulses of the spread-spectrum clock SSC_CLK which is to be counted during the fixed period of time Δt if the frequency of the spread-spectrum clock SSC_CLK falls in one of the plurality of sub-ranges.

Figure 4:
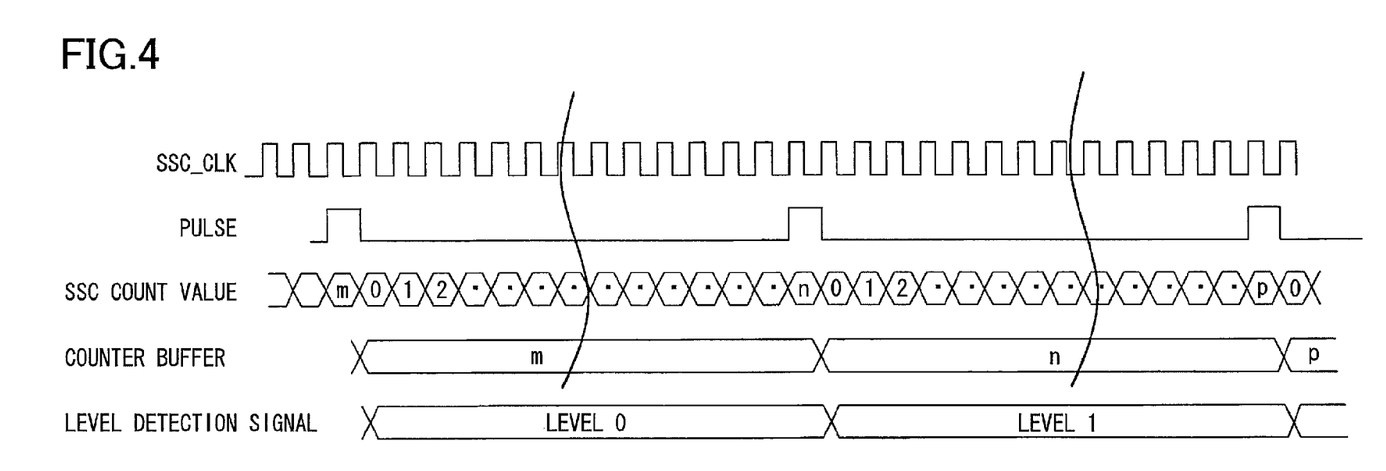
FIG. 4 is a timing chart illustrating a function of the frequency level detecting device.

FIG. 4 is a timing chart illustrating the function of the frequency level detection circuit 4. As shown in FIG. 4, the pulse generating circuit 48 generates a pulse for each fixed interval Δt during a period of time that the spread-spectrum clock SSC_CLK is generated. The SSC count value counted by the SSC counter 42 is saved in the counter buffer 51 in synchronization with this pulse. At the same time, the SSC counter 42 is reset to 0 and begins counting anew. Consequently, the decoder 57 can output a level detection signal corresponding to one of the frequency levels 0, 1, ... based on the SSC count value saved in the counter buffer 51.

In this way, the frequency level detection circuit 4 can output a level detection signal representing the frequency level of the spread-spectrum clock SSC_CLK, regardless of which frequency level.

Moreover, the frequency level detection circuit 4 compares the SSC count value produced when the PLL 41 multiplies the spread-spectrum clock SSC_CLK to each of the threshold values A-G multiplied by the same factor, as shown in FIG. 3. Accordingly, the frequency level detection circuit 4 can properly determine the frequency level of the spread-spectrum clock SSC_CLK, even when there is little difference between clock count values corresponding to each frequency level.

If the count values were not multiplied, a count value corresponding to frequency level 0 would be less than 121.4, while a count value corresponding to frequency level 1 would be greater than or equal to 121.4 and less than 121.9, for example. However, since count values can only be treated as integer values, it is not possible to differentiate the two count values. On the other hand, when the count values are multiplied by a factor of 2, the count value for frequency level 0 would be less than 242.8, while the count value corresponding to frequency level 1 would be greater than or equal to 242.8 and less than 243.8. Since the difference between these two ranges is 1 or greater, it is possible to properly determine the frequency level.

Figure 5:
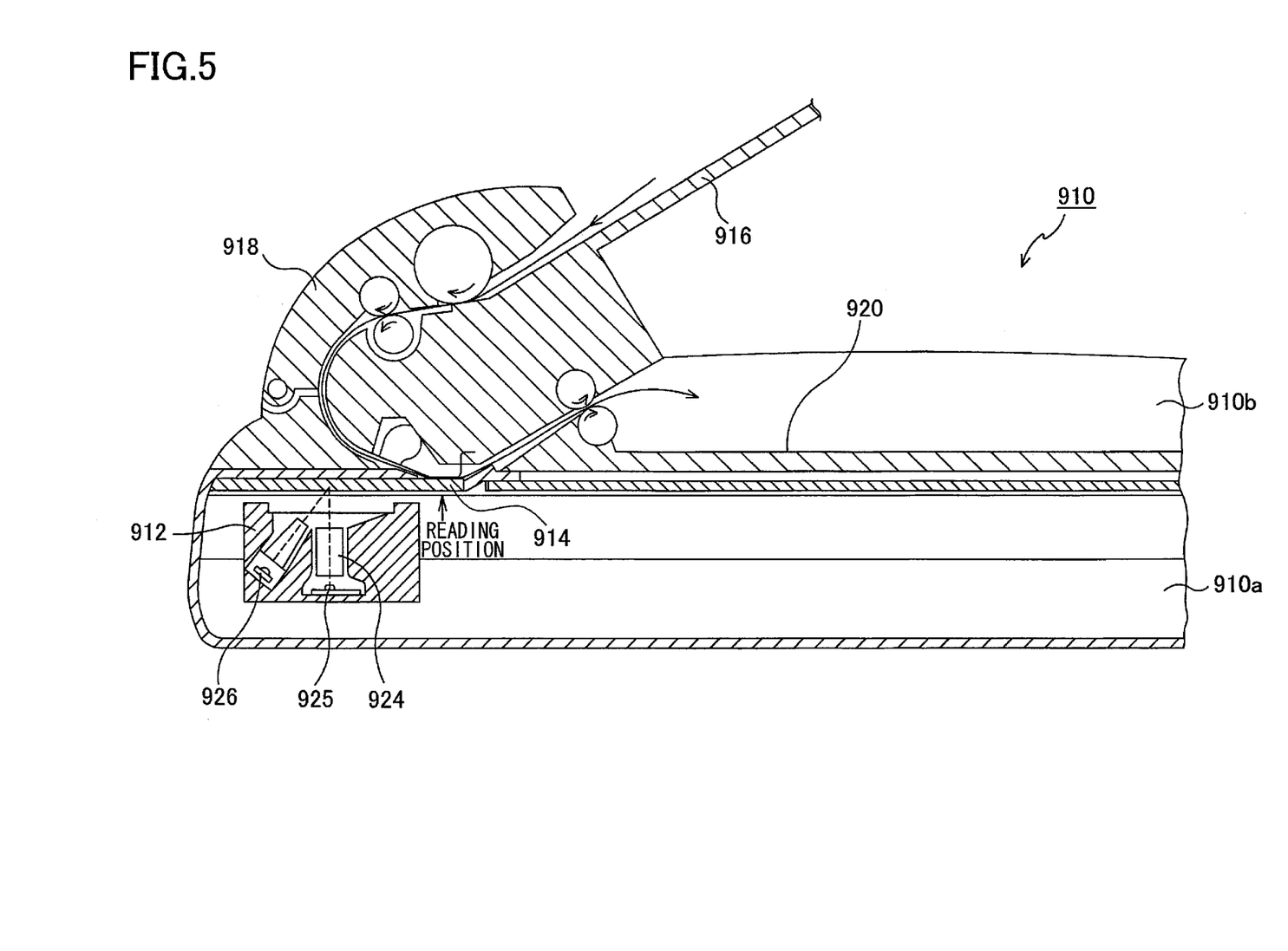
FIG. 5 is a cross-sectional view showing the structure of an image-reading device including the frequency level detecting device.

Next, the image-reading device 910 incorporating the frequency level detection circuit 4 will be described. FIG. 5 is a cross-sectional view showing the structure of the image-reading device 910.

As shown in FIG. 5, the image-reading device 910 includes a flatbed section 910a, and a cover section 910b. The flatbed section 910a is provided with a contact image sensor (CIS) type reading head 912, a first platen glass 914, and the like. The cover section 910b is provided with a document feed tray 916, a document conveying mechanism 918, a document discharge tray 920, and the like.

The reading head 912 includes a CIS 925, a gradient index (self-focusing) lens 924, and a light source 926. With this reading head 912, the light source 926 irradiates light onto an original document placed in a reading position. The light reflected off the original document is focused by the gradient index lens 924 to form an image on the CIS 925, enabling the reading head 912 to acquire an image of the original.

Figure 6:
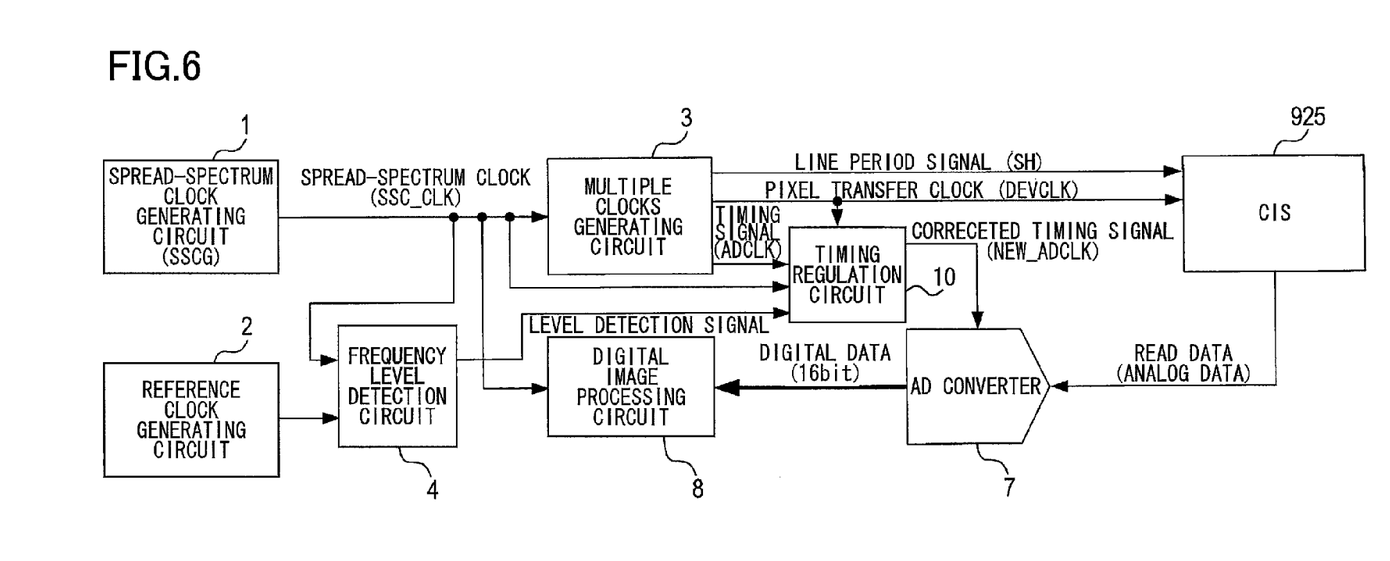
FIG. 6 is a block diagram showing the configuration of the image-reading device shown in FIG. 5.

As shown in FIG. 6, the image-reading device 910 according to the first embodiment is provided with the spread-spectrum clock generating circuit 1, which functions to generate a spread-spectrum clock SSC_CLK whose frequency is spread across a plurality of frequency levels over a constant modulation period, and the reference clock generating circuit 2 for generating a reference clock. The spread-spectrum clock SSC_CLK generated by the spread-spectrum clock generating circuit 1 is inputted into a multiple clocks generating circuit 3. The CPU (not shown) as the threshold value setting unit 5 determines and stores the threshold values A-G in the configuration register 53 when the CPU changes the mode of the image-reading device 910. At the time, the CPU can change and set a suitable frequency of reference clock generated by the reference clock generating circuit 2, and a suitable frequency of spread-spectrum clock SSC_CLK generated by the SSCG 1.

The multiple clocks generating circuit 3 generates a pixel transfer clock DEVCLK, which is a pixel period signal that changes within a single pixel period, and a line period signal SH, and outputs these signals to the CIS 925. The pixel transfer clock DEVCLK is a signal that alternates between high and low every half of a pixel period. The multiple clocks generating circuit 3 also generates an Analog-Digital conversion timing signal (hereinafter simply referred to as a "timing signal") ADCLK corresponding to a single pixel period, and outputs this signal to a timing regulation circuit 10 described later. The timing signal ADCLK functions to control the timing at which data for the original outputted from the CIS 925 (an analog signal referred to hereinafter as "read data") is converted to a digital signal. The timing signal ADCLK is outputted when a prescribed number of pulses are counted in the spread-spectrum clock SSC_CLK after the pixel transfer clock DEVCLK signal rises to indicate the start of pixel period.

The read data outputted by the CIS 925 is converted to digital data by an AD converter 7, after which the converted data is inputted into a digital image processing circuit 8. The digital image processing circuit 8 executes various image processes on the digital data, such as shading correction, gamma correction, and other correction processes; a resolution conversion process; a filtering process; a color conversion process; and a thresholding process.

Since the frequency of the spread-spectrum clock SSC_CLK is continuously changing, the following problem occurs when the AD converter 7 performs AD conversion at a timing based on the timing signal ADCLK outputted from the multiple clocks generating circuit 3.

When the CIS 925 begins outputting read data on the rising edge of the pixel transfer clock DEVCLK and the AD converter 7 subsequently executes AD conversion on the rising edge of the timing signal ADCLK, corresponding with a prescribed rising edge of the spread-spectrum clock SSC_CLK, the timing of AD conversion varies according to the frequency of the spread-spectrum clock SSC_CLK. Consequently, the digital data acquired through AD conversion can vary due to the shift in AD conversion timing.

As described above, the frequency level detection circuit 4 detects the frequency level of the spread-spectrum clock SSC_CLK generated at the current time by comparing the spread-spectrum clock SSC_CLK to the reference counter value, and outputs this level in the form of a level detection signal.

In response to the level detection signal outputted from the frequency level detection circuit 4, the timing regulation circuit 10 performs delay compensation on the timing signal ADCLK to generate a corrected timing signal new_ADCLK. By inputting this corrected timing signal new_ADCLK into the AD converter 7 in place of the timing signal ADCLK, the timing regulation circuit 10 can suppress irregularities in AD conversion timing.

While the modulation period of the spread-spectrum clock SSC_CLK is divided into 16 equal time intervals in FIG. 2, the modulation period may instead by divided into nonuniform intervals or divided according to clock cycles rather than time.

Figure 7:
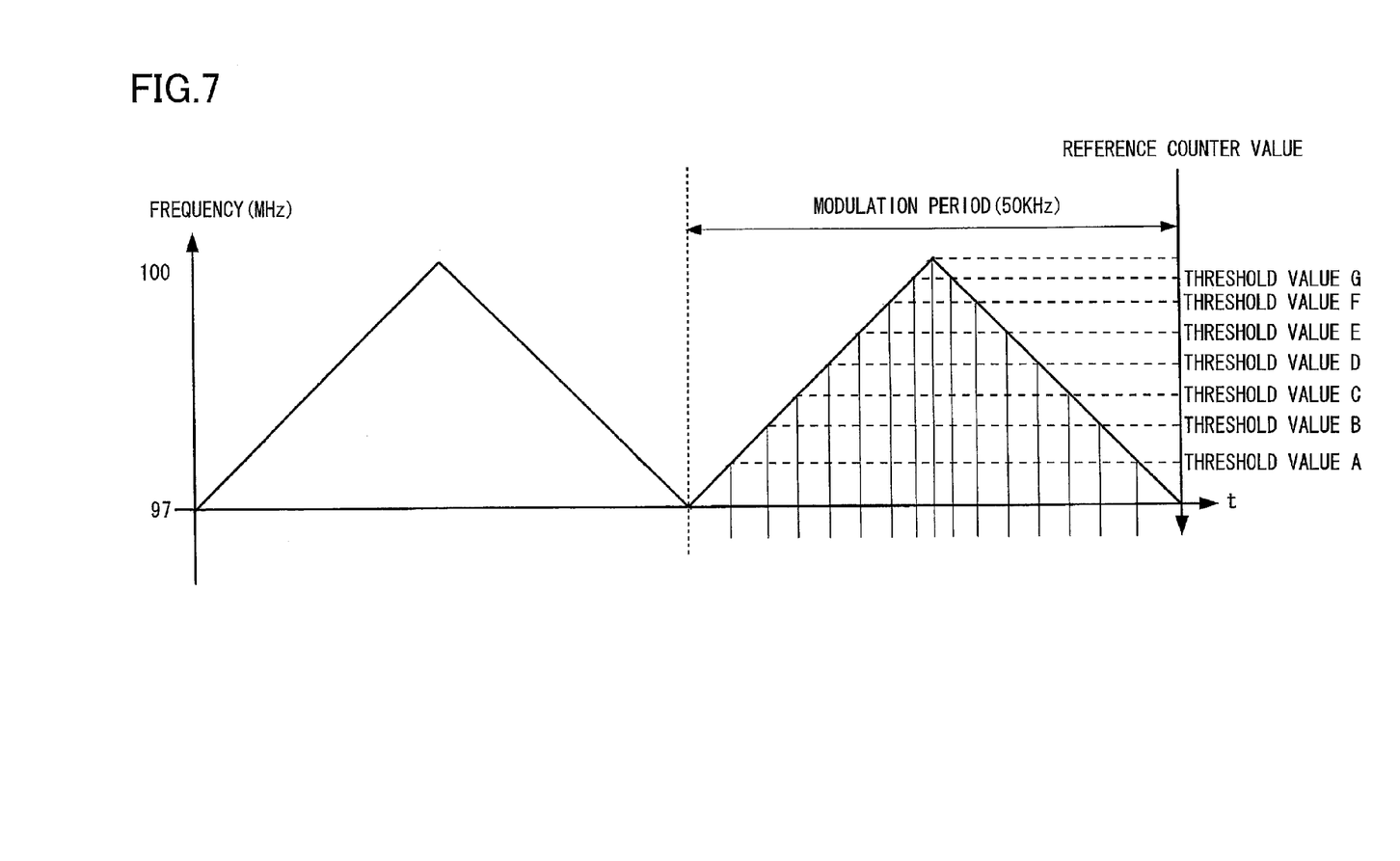
FIG. 7 is a graph showing an example of a spread-spectrum clock whose frequency level is detected by the frequency level detecting device according to a second embodiment.
Figure 8:
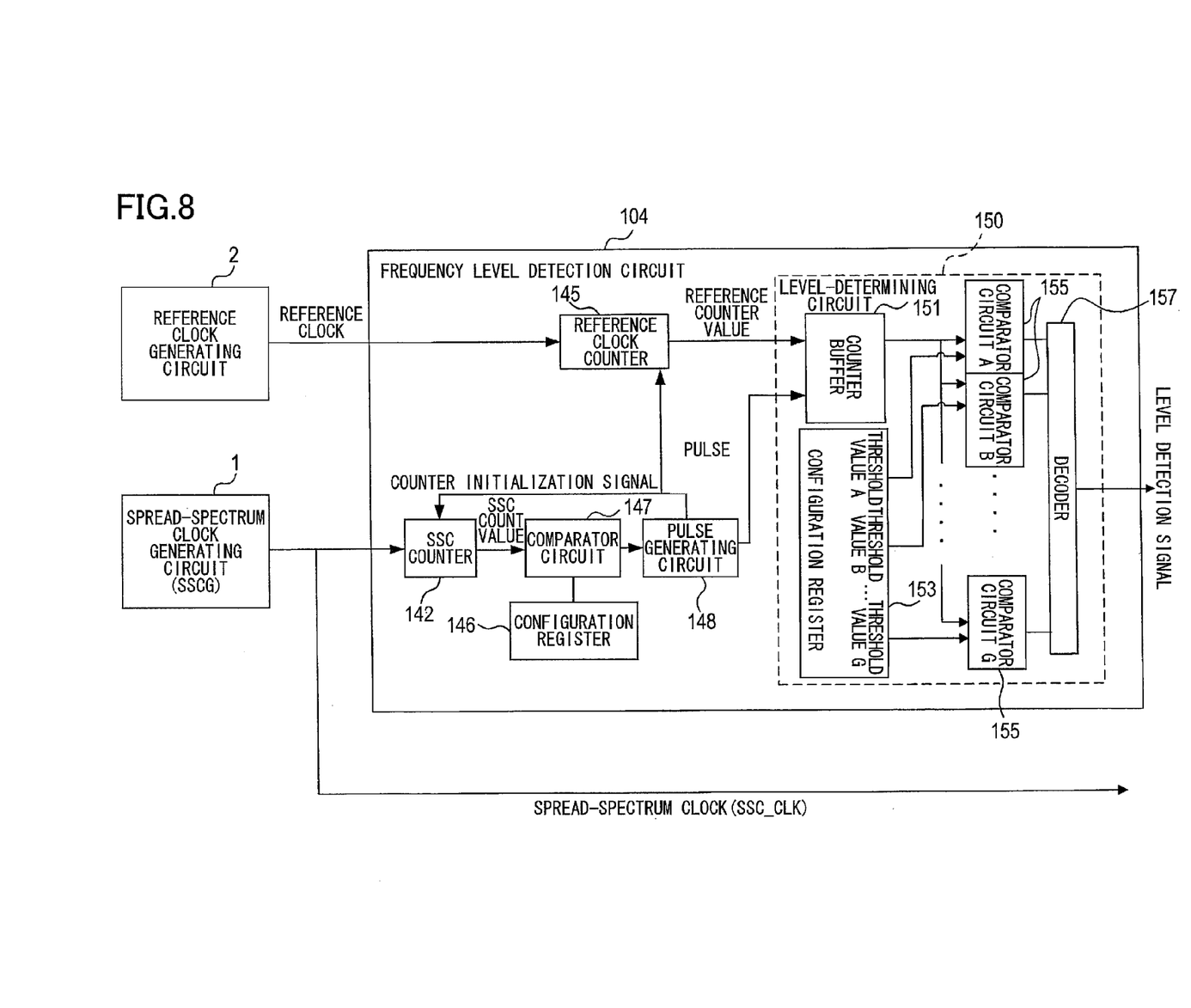
FIG. 8 is a block diagram showing the configuration of the frequency level detecting device according to the second embodiment.

According to a second embodiment of the present invention illustrated in FIGS. 7 and 8, the total number of clock pulses within the modulation period of the spread-spectrum clock SSC_CLK is divided equally into 16 intervals of clock pulses. As shown in FIG. 7, the time required for the spread-spectrum clock SSC_CLK to generate a fixed number of clock pulses is less at higher frequencies of the spread-spectrum clock SSC_CLK. Therefore, it is possible to set a threshold value for the time required for the spread-spectrum clock SSC_CLK to generate a fixed number of clock cycles in order to determine the frequency level of the spread-spectrum clock SSC_CLK.

FIG. 8 is a block diagram showing the configuration of a frequency level detection circuit 104 according to the second embodiment. As shown in FIG. 8, the frequency level detection circuit 104 includes a reference clock counter 145 for counting pulses of a reference clock generated by the reference clock generating circuit 2. This count value is inputted into a counter buffer 151 of a level determining circuit 150 as a reference count value. The frequency level detection circuit 104 also includes an SSC counter 142 for counting the pulses of the spread-spectrum clock SSC_CLK generated by the spread-spectrum clock generating circuit 1 as a SSC count value. The SSC count value is inputted into a comparator circuit 147. The comparator circuit 147 is connected to a configuration register 146 storing a fixed count value. In other words, the SSC counter 142, configuration register 146, and the comparator circuit 147 count the prescribed number of pulses of the spread-spectrum clock SSC_CLK. Therefore, the reference clock counter 145 measures a period of time defined since the pulses of the spread-spectrum clock SSC_CLK has been started counting by the SSC counter 142 until the prescribed number of pulses of the spread-spectrum clock SSC_CLK has been counted.

A pulse generating circuit 148 generates a pulse when the clock pulses (SSC count value) counted by the SSC counter 142 and the count value (the fixed count value) stored in the configuration register 146 match in comparison results by the comparator circuit 147. The pulse generated by the pulse generating circuit 148 is inputted into the counter buffer 151 and also into the SSC counter 142 as a counter initialization signal.

Accordingly, the counter buffer 151 can output the pulse count (reference counter value) of the reference clock that is counted during a period in which a fixed number of pulses has been generated in the spread-spectrum clock SSC_CLK. This outputted reference counter value corresponds to the time required for the spread-spectrum clock SSC_CLK to generate the fixed number of pulses. The level determining circuit 150 also includes a configuration register 153 for storing counter values to be compared with output from the counter buffer 151 in association with threshold values set for the above time, seven comparator circuits 155 for comparing the output from the counter buffer 151 with the counter value corresponding to each of the threshold values, and a decoder 157 for outputting a level detection signal based on the results of these comparisons. More specifically, the configuration register 153 stores, for each frequency level, data indicative of range of period of time to be measured during which the prescribed number of pulses of the spread-spectrum clock are counted when a frequency of the spread-spectrum clock falls within the frequency level.

In the configuration of the frequency level detection circuit 104 described above, the PLL 41 described in FIG. 1 may also be disposed between the reference clock generating circuit 2 and reference clock counter 145 for more precisely measuring the time required for the spread-spectrum clock SSC_CLK to generate a fixed number of cycles.

Naturally, the PLL 41 may also be omitted from the frequency level detection circuit 4 described above in the first embodiment when the difference between ranges of clock cycles corresponding to each frequency level is 1 or greater without multiplying. Further, instead of multiplying the spread-spectrum clock SSC_CLK with a PLL or the like, it is possible to add the SSC count value n times for each fixed interval Δt.

Figure 9:
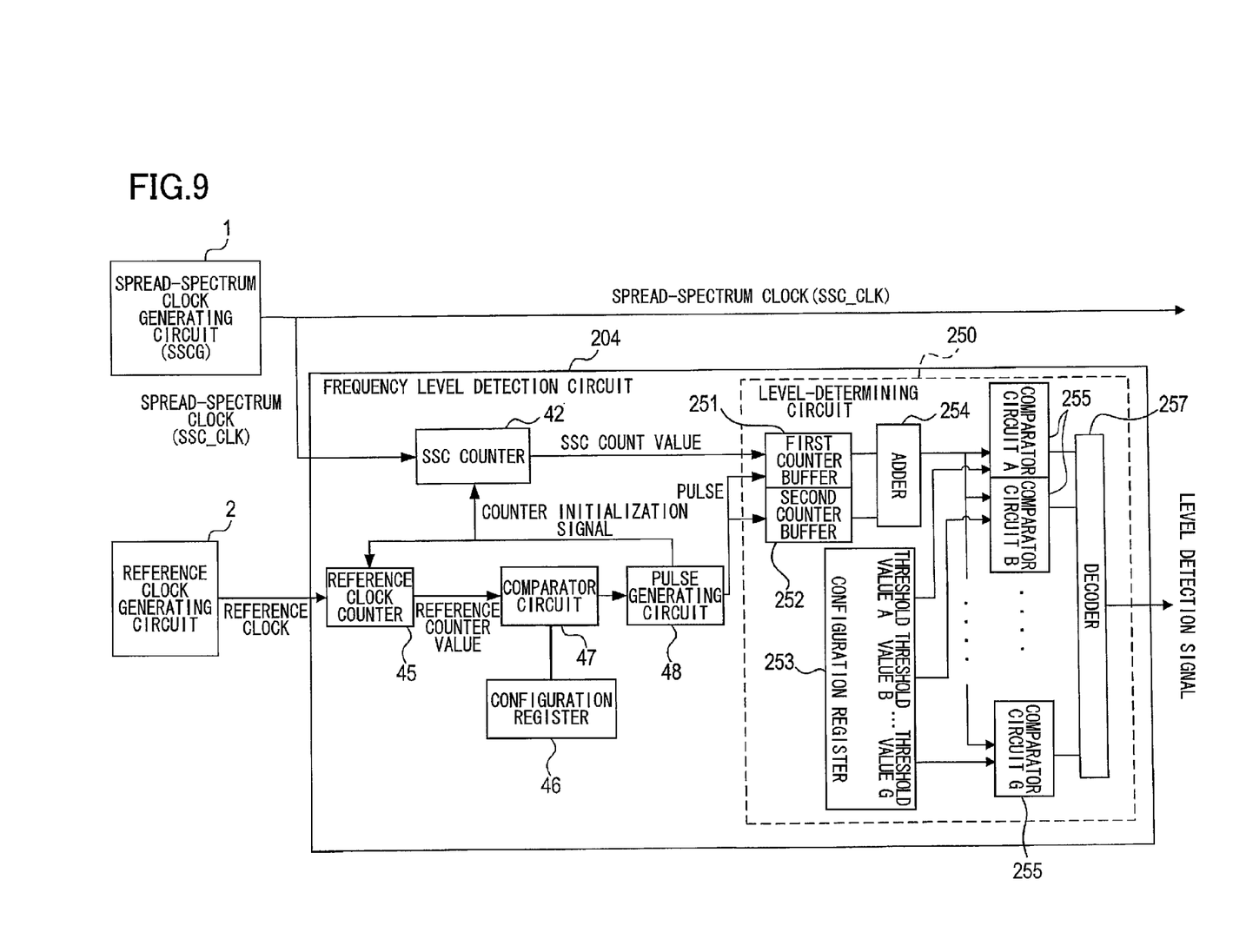
FIG. 9 is a block diagram showing the configuration of the frequency level detecting device according to a third embodiment.

FIG. 9 shows a frequency level detection circuit 204 according to a third embodiment of the present invention. Since the frequency level detection circuit 204 has the same basic construction as the frequency level detection circuit 4 according to the first embodiment including the configuration from the spread-spectrum clock generating circuit 1 and reference clock generating circuit 2 to a level determining circuit 250, but excluding the PLL 41, like parts and components are designated with the same reference numerals to avoid duplicating description.

The level determining circuit 250 has the same basic configuration as the level-determining circuit 50 of the first embodiment, but includes a first counter buffer 251 and a second counter buffer 252 identical to the single counter buffer 51 described in the first embodiment. As described in the first embodiment, an SSC count value is saved in the first counter buffer 251 in synchronization with the pulse generated by the pulse generating circuit 48. At the same time, the SSC count value is transferred to the second counter buffer 252 before the value saved in the first counter buffer 251 is updated. In other words, the second counter buffer 252 stores a count value indicative of a number of pulses of the spread-spectrum clock that has been counted for n fixed periods of time that are immediately before the pulses of the spread-spectrum clock are counted for the fixed interval Δt. The 'n' is an integer greater than or equal to one. The counter buffers 251 and 252 are both connected to an adder 254. The adder 254 adds the SSC count values saved in the counter buffers 251 and 252 and outputs the resulting SSC count value. Hence, the adder 254 outputs an SSC count value that represents the total count over two consecutive fixed intervals Δt.

The level determining circuit 250 according to the third embodiment also includes a configuration register 253 that stores threshold values for each pair of adjacent frequency levels, seven comparator circuits 255 for comparing output from the adder 254 with each of these threshold values, and a decoder 257 for outputting a level detection signal based on the results of these comparisons.

Since both the SSC count values and the threshold values compared by the comparator circuits 255 are approximately double the count values in the first embodiment, the frequency level detection circuit 204 according to the third embodiment can properly determine the frequency level of the spread-spectrum clock SSC_CLK, even when there is only a small difference in clock cycles corresponding to each individual frequency level. This configuration is similar to providing the PLL 41 in the frequency level detection circuit 4 for multiplying the spread-spectrum clock SSC_CLK by 2. Although the SSC counter saved in the first counter buffer 251 is transferred to the second counter buffer 252 in the third embodiment, it is also possible to overwrite the SSC counter value stored in the counter buffers 251 and 252 alternately.

While the frequency level detection circuit 204 according to the third embodiment can detect the frequency level of the spread-spectrum clock SSC_CLK for all frequency levels, it is sufficient for the frequency level detection circuit 204 to be able to detect the frequency level of the spread-spectrum clock SSC_CLK for at least one level. In such a case, after the frequency level detection circuit 204 detects that the spread-spectrum clock SSC_CLK corresponds to this single frequency level, the frequency level detection circuit 204 can then estimate the frequency level of the spread-spectrum clock SSC_CLK based on the elapsed time after this detection.

Figure 10:
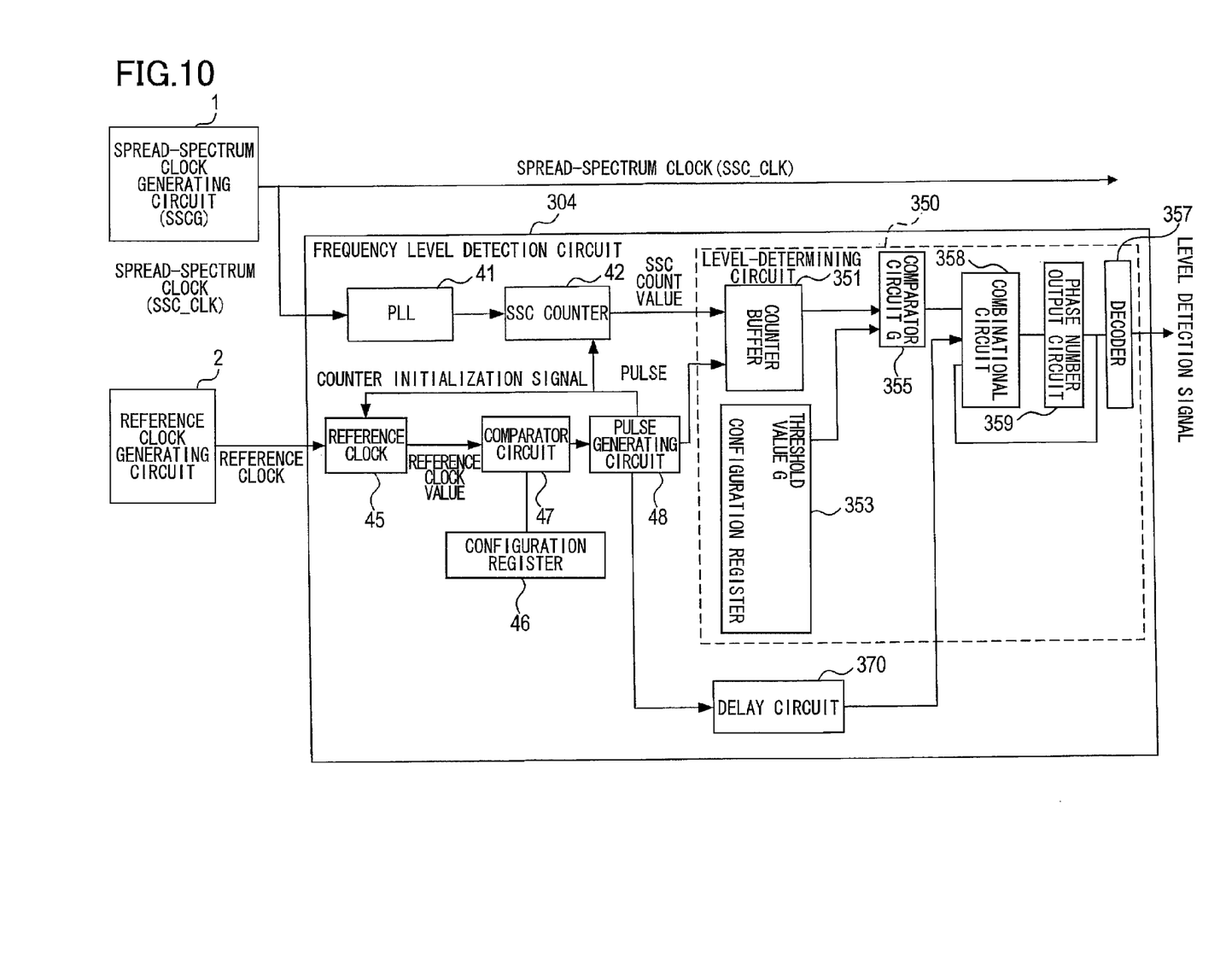
FIG. 10 is a block diagram showing the configuration of the frequency level detecting device according to a fourth embodiment.

Next, a frequency level detection circuit 304 according to a fourth embodiment of the present invention will be described with reference to FIG. 10. Since the frequency level detection circuit 304 according to the fourth embodiment has the same basic configuration as the frequency level detection circuit 4 from the spread-spectrum clock generating circuit 1 and reference clock generating circuit 2 up to a level determining circuit 350, like parts and components are designated with the same reference numerals to avoid duplicating description.

The level determining circuit 350 according to the fourth embodiment includes a counter buffer 351 similar to the counter buffer 51 according to the first embodiment, and a configuration register 353. However, the configuration register 353 only stores the threshold value G (see FIG. 2), which is the count value among the seven threshold values that defines the range of the highest frequency level 7. Consequently, the level determining circuit 350 is provided with only a single comparator circuit 355 for comparing the SSC count value saved in the counter buffer 351 with the threshold value G. The single comparator circuit 355 judges whether or not the SSC count value falls within a range corresponding to the highest frequency level.

The comparison results from the comparator circuit 355 are inputted into a combinational circuit 358 together with a pulse from the pulse generating circuit 48 that has been delayed by a delay circuit 370. The delay circuit 370 functions to allow for processing time from the moment the pulse generating circuit 48 generates the pulse until the SSC count value at this moment of pulse generation can be reflected in the comparison results of the comparator circuit 355.

The combinational circuit 358 executes the following phase number determining process based on the pulse delayed by the delay circuit 370 (hereinafter referred to as the "delay reference time pulse") and the comparison results from the comparator circuit 355, and outputs a level detection signal via a phase number output circuit 359 and a decoder 375. The combinational circuit 358 performs the phase number determining process.

Figure 11:
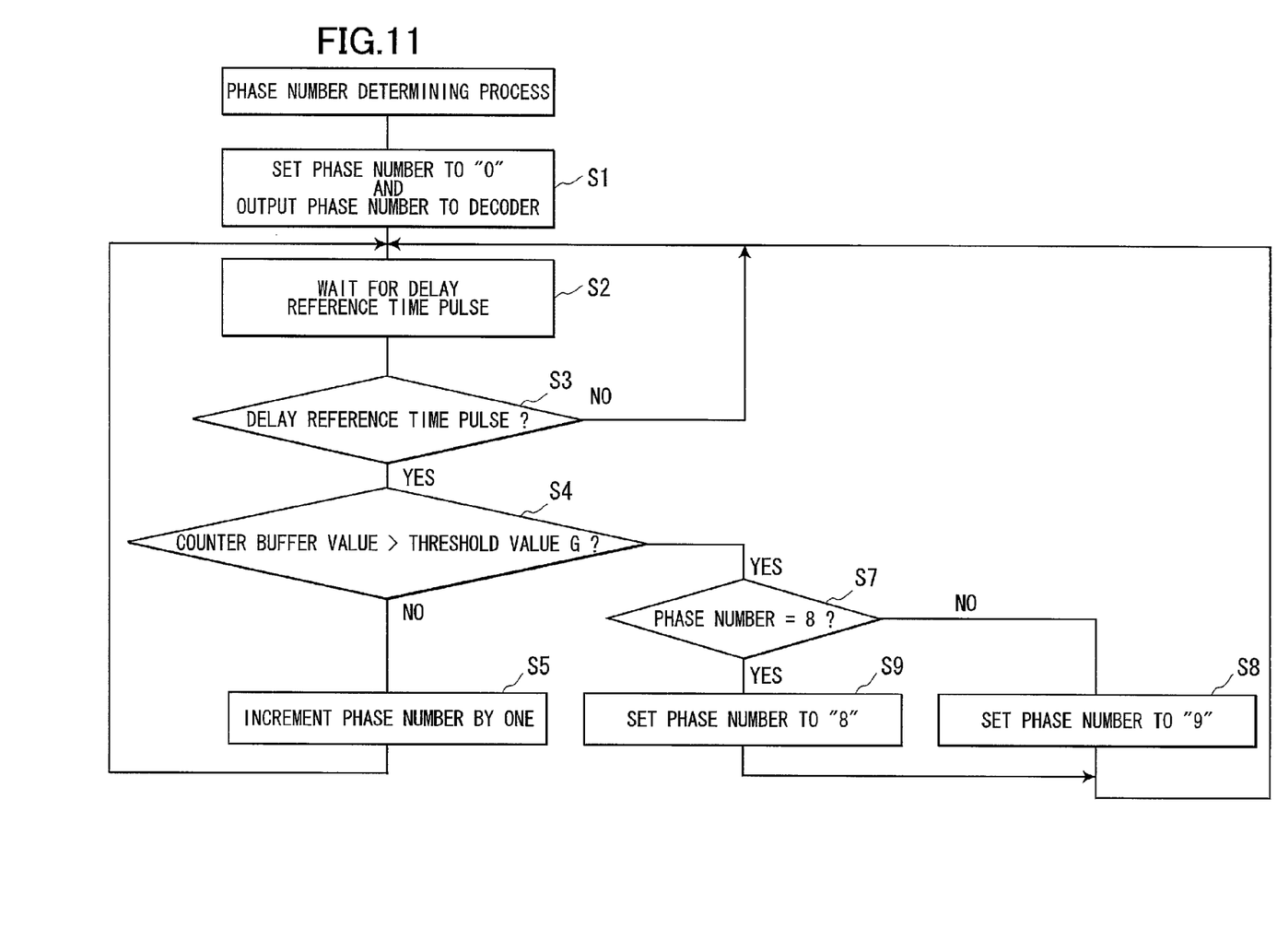
FIG. 11 is a flowchart illustrating steps in a phase number determining process executed by the frequency level detecting device according to the fourth embodiment.

In S1 of the phase number determining process shown in FIG. 11, the combinational circuit 358 sets the phase number to "0". The phase number is defined as "0" until the t has been Δt immediately after the spread-spectrum clock SSC_CLK arrived at its lowest frequency and thereafter increases by increments of 1 each time the fixed interval Δt elapses. When the combinational circuit 358 sets the phase number to "0" in S1, the phase number output circuit 359 shown in FIG. 10 inputs this phase number back into the combinational circuit 358 as feedback and outputs the same phase number to the decoder 357. Subsequently, the decoder 357 outputs a level detection signal corresponding to the phase number 0, i.e., the frequency level 0 for frequencies less than the threshold value A.

In S2 the combinational circuit 358 enters a pulse wait state to wait for the reference time pulse from the delay circuit 370, and in S3 determines whether the delay reference time pulse was inputted from the delay circuit 370. While the delay reference time pulse has not been inputted (S3: NO), the combinational circuit 358 returns to S2 and continues to wait while looping between S2 and S3. In other words, the combinational circuit 358 measures an elapsed time. When the delay reference time pulse is inputted (S3: YES), in S4 the combinational circuit 358 determines whether the SSC counter values stored in the counter buffer 351 (hereinafter referred to as the "counter buffer value") exceeds the threshold value G based on the comparison results from the comparator circuit 355. In other words, the combinational circuit 358 judges whether or not counter buffer value falls within a sub-range corresponding to the highest frequency level. If the counter buffer value is no greater than the threshold value G (S4: NO), in S5 the combinational circuit 358 outputs the phase number, increments the phase number by 1, and returns to S2 described above. In the other words, the combinational circuit 358 determines, based on the elapsed time, which of frequency level the frequency of the spread-spectrum clock fall within in S5.

However, when the combinational circuit 358 determines in S4 that the counter buffer value is greater than the threshold value G (S4: YES), in S7 the combinational circuit 358 determines whether or not the phase number is "8". If the phase number is not "8" (S7: NO), then in S8 the combinational circuit 358 sets the phase number to "8". If the phase number is already "8" (S7: YES), in S9 the combinational circuit 358 sets the phase number to "9". After setting the phase number in S8 or S9 in this way, the combinational circuit 358 returns to S2 described above. Specifically, when the counter buffer value is greater than the threshold value G (S4: YES), the phase number at that point in time must be either "7" or "8", as illustrated in FIG. 2. Therefore, the combinational circuit 358 sets the phase number to "9" in S9 when the phase number is "8" (S7: YES) and sets the phase number to "8" in S8 when the phase number is not "8" (S7: NO), i.e., when the phase number is "7".

As a result of the above process, the combinational circuit 358 sets a phase number determined based on the measured elapsed time and outputs the phase number to the decoder 357 via the outputs the 359. The decoder 357 outputs signal corresponding to the next phase number. In other words, the decoder 357 generates another level detection signal indicating that a frequency level of the spread-spectrum clock falls within the frequency level that is determined based on the measured elapsed time. While not detailed in FIG. 11, the combinational circuit 358 resets the phase number to "0" when the current phase number is determined to be "15" in S5.

The frequency level detection circuit 304 according to the fourth embodiment described above can reliably estimate the frequency level of the spread-spectrum clock SSC_CLK at any point in time by simply storing one threshold value in the configuration register 353. Here, the time elapsed after the counter buffer value exceeds the threshold value G does not necessarily need to be found by counting reference clock pulses, as described above, but may be measured directly with a timer or the like. Further, once the counter buffer value surpasses the threshold value G, the frequency level may be estimated based on elapsed time by a timer. However, in the fourth embodiment, the phase number is set based on the counter buffer value after each modulation period (S7-S9). In this way, the method of the fourth embodiment reliably avoids a decline in precision for estimating the frequency level caused by an accumulation of time measuring error. Further, it should be apparent that the present invention may be similarly applied to various electronic equipment other than an image-reading device, provided that the equipment uses a spread-spectrum clock.

Further, the configuration register 353 stores threshold value G in the fourth embodiment. However, only two adjacent threshold values defining one sub-range (one frequency level) may be stored in the configuration register 353 and used for judging whether or not the frequency falls within a frequency level corresponding to the one sub-range. In this case, the two adjacent threshold values can define three sub-ranges.

While the invention has been described in detail with reference to the embodiments thereof, it would be apparent to those skilled in the art that various changes and modifications may be made therein without departing from the spirit of the invention. For example, the threshold value may be determined, for each frequency level, based on a mediate or average value of the frequencies that fall within the sub-range corresponding to the frequency level.

Further, these processes for detecting frequency level of the spread-spectrum clock SSC_CLK according to the first, second, third, and fourth embodiment may be implemented as a programmed general purpose computer.

What is claimed is:

1. A frequency level detecting method comprising:
counting pulses of a spread-spectrum clock, the spread-spectrum clock having a frequency that is modulated within a frequency range from a minimum frequency to a maximum frequency in a constant modulation period of time, the frequency range being divided into a plurality of sub-ranges each corresponding to one of a plurality of frequency levels;
determining at least one to-be-counted value range corresponding to one of the plurality of sub-ranges;
judging whether or not the counted pulses fall within one of the at least one to-be-counted value range; and
generating a level detection signal if the counted pulses fall within the one of the at least one to-be-counted value range, the level detection signal indicating that a frequency of the spread-spectrum clock falls within one of the plurality of frequency levels that corresponds to one of the plurality of sub-ranges corresponding to the one of the at least one to-be-counted value range.

2. The frequency level detecting method according to claim 1, wherein the determining determines a plurality of to-be-counted value ranges each corresponding to one of the plurality of sub-ranges.

3. The frequency level detecting method according to claim 1, wherein the step of counting pulses includes:
measuring a fixed period of time; and
counting pulses of the spread-spectrum clock during the fixed period of time.

4. The frequency level detecting method according to claim 3, wherein the determining determines, as one of the at least one to-be-counted value range corresponding to one of the plurality of sub-ranges, a range of the number of pulses of the spread-spectrum clock which is to be counted during the fixed period of time if the frequency of the spread-spectrum clock falls in the one of the plurality of sub-ranges.

5. The frequency level detecting method according to claim 3, wherein the step of counting pulses further includes:
acquiring a count value indicative of a number of pulses of the spread-spectrum clock that has been counted for n fixed periods of time that are immediately before the pulses of the spread-spectrum clock are counted for the fixed period of time, 'n' being an integer that is greater than or equal to one; and
adding the count value to the counted pulses.

6. The frequency level detecting method according to claim 3, wherein the step of counting pulses further includes measuring an elapsed time since the level detection signal has generated,
wherein, after the level detection signal is generated, the judging further determines, based on the measured elapsed time, which of the frequency levels the frequency of the spread-spectrum clock falls within, and
wherein the generating further generates another level detection signal indicating that a frequency of the spread-spectrum clock falls within the frequency level that is determined based on the measured elapsed time.

7. The frequency level detecting method according to claim 1, wherein the step of counting pulses includes:
measuring a fixed period of time;
multiplying the spread-spectrum clock by m, 'm' being an integer greater than one; and
counting, for the fixed period, pulses of the multiplied spread-spectrum clock.

8. The frequency level detecting method according to claim 7, wherein the frequency range is divided into at least three sub-ranges, and
wherein the frequency range includes a first threshold value and a second threshold value, each of the first threshold value and the second threshold value being an integer, the first threshold value and the second threshold value defining the three sub-ranges, a difference between the first threshold value and the second threshold value being an integer greater than or equal to one.

9. A frequency level detecting device comprising:
a counting unit that is configured to count pulses of a spread-spectrum clock, the spread-spectrum clock having a frequency that is modulated within a frequency range from a minimum frequency to a maximum frequency in a constant modulation period of time, the frequency range being divided into a plurality of sub-ranges each corresponding to one of a plurality of frequency levels;
a storing unit that is configured to store data indicative of at least one to-be-counted value range corresponding to one of the plurality of sub-ranges;
a judging unit that is configured to judge whether or not the counted pulses fall within one of the at least one to-be-counted value range; and a generating unit that is configured to generate a level detection signal if the judging unit judges that the counted pulses fall within one of the at least one to-be-counted value range, the level detection signal indicating that a frequency of the spread-spectrum clock falls within one of the plurality of frequency levels that corresponds to one of the plurality of sub-ranges corresponding to the one of the at least one to-be-counted value range.

10. The frequency level detecting device according to claim 9, wherein the data indicates a plurality of to-be-counted value ranges each corresponding to one of the plurality of sub-ranges.

11. The frequency level detecting device according to claim 9, wherein the counting unit includes:
a first timer that is configured to measure a fixed period of time;
a counter that is configured to count pulses of the spread-spectrum clock during the fixed period of time.

12. The frequency level detecting device according to claim 11, wherein the data indicates, as one of the at least one to-be-counted value range corresponding to one of the plurality of sub-ranges, a range of the number of pulses of the spread-spectrum clock which is to be counted by the counter during the fixed period of time if the frequency of the spread-spectrum clock falls in the one of the plurality of sub-ranges.

13. The frequency level detecting device according to claim 11, wherein counting unit further includes:
an acquiring unit that is configured to acquire a count value indicative of a number of pulses of the spread-spectrum clock that has been counted for n fixed periods of time that are immediately before the pulses of the spread-spectrum clock are counted for the fixed period of time, 'n' being an integer that is greater than or equal to one; and
an adding unit that is configured to add the count value to the counted pulse.

14. The frequency level detecting device according to claim 11, wherein counting unit further includes a second timer that is configured to measure an elapsed time since the generating unit has generated the level detection signal,
wherein, after the generating unit generates the level detection signal, the judging unit further determines, based on the measured elapsed time, which of the frequency levels the frequency of the spread-spectrum clock falls within, and
wherein the generating unit further generates another level detection signal indicating that a frequency of the spread-spectrum clock falls within the frequency level that is determined based on the measured elapsed time.

15. The frequency level detecting device according to claim 9, wherein counting unit includes:
a first timer that is configured to measure a fixed period of time;
a multiplying unit that is configured to multiply the spread-spectrum clock by m, 'm' being an integer greater than one;
a counter that is configured to count, for the fixed period, pulses of the spread-spectrum clock that is multiplied by the multiplying unit.

16. The frequency level detecting device according to claim 15, wherein the frequency range is divided into at least three sub-ranges, and
wherein the data includes a first threshold value and a second threshold value, each of the first threshold value and the second threshold value being an integer, the first threshold value and the second threshold value defining the three sub-ranges, a difference between the first threshold value and the second threshold value being an integer greater than or equal to one.

17. A frequency level detecting device comprising:
a counting unit that is configured to count pulses of a spread-spectrum clock, the spread-spectrum clock having a frequency that is modulated within a frequency range from a minimum frequency to a maximum frequency in a constant modulation period of time, the frequency range being divided into a plurality of sub-ranges each corresponding to one of a plurality of frequency levels;
a time measuring unit that is configured to measure a period of time defined since the counting unit has started counting the pulses of the spread-spectrum clock until the counting unit has counted a prescribed number of pulses of the spread-spectrum clock;
a storing unit that is configured to store data indicative of at least one to-be-measured time range corresponding to one of the plurality of sub-ranges;
a judging unit that is configured to judge whether or not the measured period of time falls within one of the at least one to-be-measured time range; and
a generating unit that is configured to generate a level detection signal if the judging unit judges that the measured period of time falls within one of the at least one to-be-measured time range, the level detection signal indicating that a frequency of the spread-spectrum clock falls within one of the plurality of frequency levels that corresponds to one of the plurality of sub-ranges corresponding to the one of the at least one to-be-measured time range.

18. The frequency level detecting device according to claim 17, wherein the data indicates, as one of the at least one to-be-measured time range corresponding to one of the plurality of frequency levels, a range of period of time to be measured by the time measuring unit during which the counting unit counts the prescribed number of pulses of the spread-spectrum clock whose frequency falls within the one of the plurality of frequency levels.

* * * * *